Oct. 1, 1968  J. H. LEMELSON  3,403,717
SEALING AND BONDING DEVICE
Filed Feb. 14, 1966

INVENTOR.
Jerome H. Lemelson
BY
Arthur F. Fattibene
ATTORNEY

United States Patent Office 3,403,717
Patented Oct. 1, 1968

3,403,717
SEALING AND BONDING DEVICE
Jerome H. Lemelson, 85 Rector St.,
Metuchen, N.J. 08840
Continuation-in-part of application Ser. No. 289,096,
June 19, 1963. This application Feb. 14, 1966, Ser.
No. 536,502
14 Claims. (Cl. 151—37)

ABSTRACT OF THE DISCLOSURE

An improved sealing construction arranged to provide an automatic seal between two mating members adapted to be brought together under pressure. The construction comprises essentially a rigid base member having a flat bearing surface adapted to be disposed against the surface of a secondary body when placed in compression. The base member includes a flexible annular lip having an inclined free end protruding outwardly from the plane of the bearing surface and being constructed to be resiliently deflected toward the bearing surface when the base member is subjected to compressive force against the secondary body, thereby resulting in a positive seal between the elements.

---

This invention is a continuation-in-part application of a copending application, Ser. No. 289,096, filed June 19, 1963, now abandoned which in turn is a division of my copending application, Ser. No. 668,720, filed June 27, 1957, now abandoned, and Ser. No. 325,382, filed Dec. 11, 1952, now abandoned.

This invention relates to an improved fluid seal and more specifically to a sealing and bonding assembly and method of sealing.

It is a primary object of this invention to provide a new and improved sealing device which will effect a fluid seal at high as well as low pressures without the need for the employment of sealing compounds or the like.

Another object is to provide new and improved sealing means which may be applied directly to or shaped from the material of various articles of manufacture such as washers, bolt heads and other fasteners, housings, flanges, casings, shafts and the like where it is desired to assemble said articles with other members in sealing engagement.

Still another object is to provide a sealing means for articles of manufacture which is integral with said articles thereby eliminating the possibility of omitting, upon assembly, a seal.

Another object is to provide an improved sealing device which exerts a constant spring force between two mating members and thereby serves also as a locking device.

Another object is to provide an improved sealing means which employs penetration of the mating surface and thereby prevents shifting of said surfaces under lateral forces applied thereto to effect a sealing and bonding assembly.

Other objects and advantages of the instant invention will be apparent from the following decription taken in conjunction with the accompanying drawings wherein.

Figure 1:
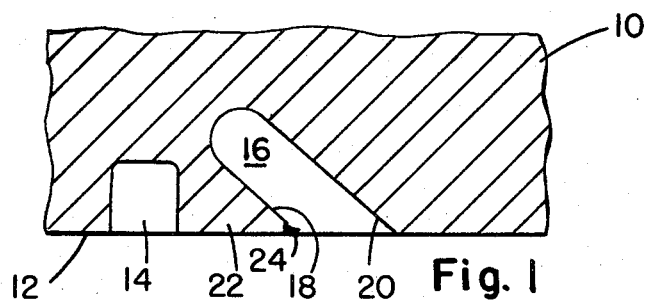
FIGURE 1 is sectional view taken across part of the annular sealing means of the invention prior to final formation of said seal.
Figure 2:
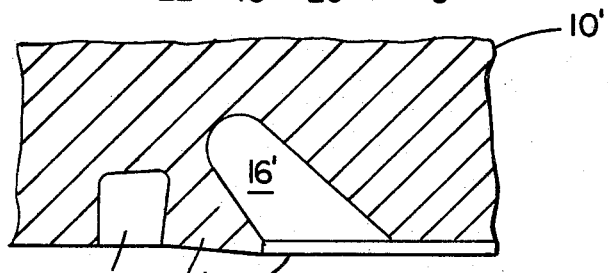
FIGURE 2 is a sectional view of the sealing means of FIG. 1 in a finished condition prior to sealing.

FIGS. 1 and 2 show the sealing device as comprising a formation in the surface 12 of a member 10 across which the fluid seal is to be effected. FIG. 1 shows the initial stage of the formation of the seal which comprises forming or cutting a first circular groove or channel 14 in said surface, as shown, adjacent and concentric with a second circular channel 16 which is shown as being somewhat deeper than channel 14, concentric with and sloped towards the other channel 16. If both said channels are circular in shape the walls 18 and 20 of the channel 16 will define essentially portions of conical surfaces. The land 22 between 14 and 16 reduces in cross sectional area inward from surface 12 and is essentially a cantilevered lip like formation. The end 24 of circular lip formation 22 may be chambered, as shown, so as not to produce too sharp an edge 26.

In FIG. 2, the lip 22 has been deformed about its necked down section 28 so that the bevelled section 24 projects beyond the plane of the surface 12.

This may be effected, if the channels have been formed in a lathe, by applying a blunt tool to the wall 18 as the member 10 spins, and exerting a force thereon in the direction of the bend. The same tool which forms channel 16 may be used to effect this bending action. The shape of FIG. 2 may also be obtained, without the need to bend, by directly machining said material to said shape or by molding it to the shape. If the member 10 is made of metal or thermoplastic material, the lip 22 may be shaped or bent while it is in a more plastic state at elevated temperature.

Figures 3, 4:
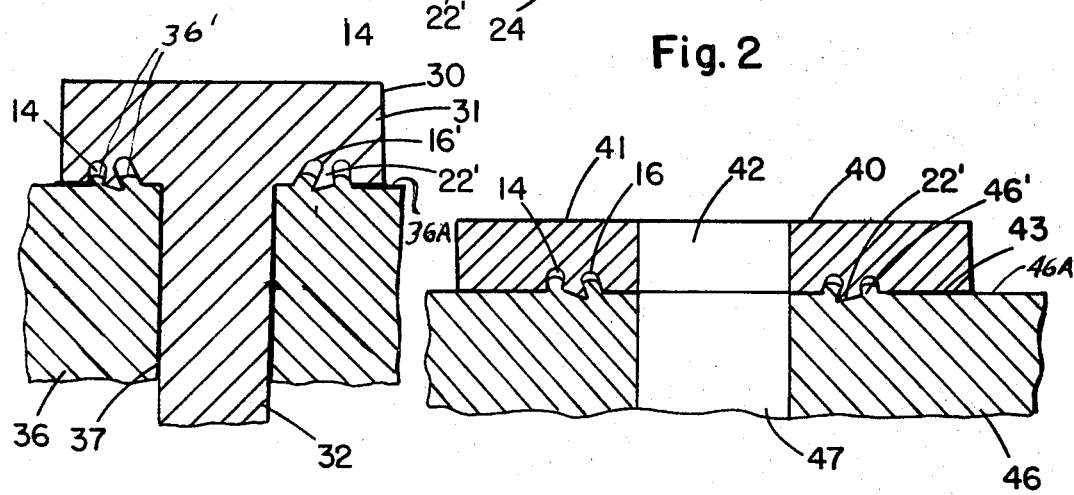
FIGURE 3 is a section view of a bolt or the like embodying the invention with a complementary mating member.
FIGURE 4 is a sectional view of a washer or the like embodying the invention as applied to a complementary member.

In the application of the seal, the surface 12 is brought towards the surface of a member, e.g., 36 or 46 to be assembled therewith. The edge 24 of lip 22' effects a seal when the circular lip 22' exerts a restoring force against said other surface, e.g., 36A or 46A. As surface 12 approaches the work, the edge 24 may, if provided tapered or sharp as shown, also deform into the mating surface, e.g., 36A, 46A to enhance the seal and provide a lateral lock, or mechanical bond therewith. However, said circular lip 22' may be blunt shaped and adapted to merely compress against the mating surface. The member 10 may be the head 30 of a bolt 31 or any other device. It may be heat treated after forming and shaping the lip 22, to improve the spring characteristics of the material and the deformed cantilevered circular lip portion 22'. If the lip 22' of FIGS. 2, 3 or 4 deforms into the work surfaces 36A or 46A, respectively and causes flow of the material 36' or 46' thereof, the channels 14' and 16' serve as volumes into which the material 36', 46' of said work surface may flow when the surface 12 is brought flush against said work 36 or 46, thus creating a seal and mechanical bond. For this type of static sealing application or combined sealing and bonding, the cantilevered circular lip portion 22' is preferably designed and dimensioned such that the surface 12 may be urged against or near the mating surface without deforming section 22' beyond its elastic limit so that it will always retain its restoring action and will return to approximately the shape shown in FIG. 2 when the surfaces 12 and that of the mating member are removed from each other. It is noted that the seal illustrated in FIG. 2 is also applicable to dynamic or rotary sealing functions involving shafts and the like. The land or lip section may also be provided to encompass the groove 14 rather than 16' as in FIG. 2.

It is noted that the annular sealing structure illustrated in FIG. 2 may be provided integral with various articles of manufacture such as sealing washers 40, bolts 31 and other fasteners, housings, casings, shafts and the like where assembly is required of said articles with other members by compressively engaging the assembled components. For example, the circular lip formation 22 may be provided in the under-face of the head of a bolt, rivet or nut circumscribing the shank 32. The annular face of a washer may also have such a lip formation formed therein to circumscribe the opening 42. The side wall of a cylindrical housing or shaft may also be provided with a circular lip formation of the type illustrated in FIG. 2.

While the instant invention has been described with reference to a particular embodiment thereof, it will be readily understood and appreciated that variations and modifications thereof may be made without departing from the spirit or scope of the invention.

I claim:

1. A sealing and bonding assembly comprising in combination,
   a first rigid base member made of a material having a predetermined hardness,
   said base member having an annular bearing surface and a circular lip formation integrally formed of said material of said base member,
   said lip being cantileveredly supported and free to flex for resiliently loading said base member in the assembled position thereof,
   and said lip having a portion thereof protruding outwardly beyond the bearing surface of said base member,
   a second member adapted for assembly with said base member, said second member having a complementary bearing surface adapted to be contiguously disposed with the bearing surface of said base member whereby said lip is free to deflect upon the compressive engagement of said members,
   and the complementary surface of said second member being formed to permit the material thereof to flow about said lip as said lip is flexed upon the assembly of said members to form a mechanical bond and hermetic seal therebetween and which seal is positively loaded due to the inherent resiliency of said lip.
   wherein said lip formation is substantially frustroconical in shape, said lip formation being reduced in cross section where it joins said base member to a degree where it may deform when said base member is drawn against said second member in a manner such that the elastic limit of the material is not exceeded and said lip formation exerts a constant restoring force between said base member and said second member.

2. A sealing device comprising:
   a rigid base member having an annular portion thereof defining a smooth flat bearing surface which is adapted to be contiguously disposed against the surface of a secondary body in assembly therewith, said member including an integrally formed annular lip protruding outwardly from the plane of said surface portion,
   said lip being resiliently connected to said rigid base whereby it may deflect toward said bearing surface to permit the engagement of said bearing surface against the surface of said secondary body when said rigid member is subjected to a compressive force to effect a positive preloaded seal across said bearing surface of said base member and said surface of said secondary body disposed thereagainst,
   said flat bearing surface of said rigid base member comprising a major portion of the surface area of said rigid member and said lip is annularly shaped intermediate the width of said bearing surface,
   a plurality of annular channels formed in the bearing surface of said rigid base member with one channel being disposed on each side of said lip wherein the adjacent wall portions of the channels define the side walls of said lip,
   said lip being deflectable into one of said channels, wherein the wall portion of said respective channels which define the side walls of said annular lip converge toward each other defining a cross sectional area of diminished thickness near the root of said lip.

3. A fastening device comprising:
   a rigid base member made of a predetermined hardness,
   said base member having a substantially planar bearing surface and a circular resilient lip formation integrally formed of the material of said base member,
   said lip being connected to said base member so as to have its free end projecting beyond the bearing surface of said rigid member intermediate the width thereof, and said lip being free to flex for resiliently loading said base member in the assembled position thereof,
   said free end being defined as a surface incline relative to the bearing surface,
   a channel formed in said rigid member adjacent said lip whereby a side wall of said channel is defined by a wall portion of said lip,
   and a second member having a complementary bearing surface adapted to be contiguously disposed to the bearing surface of said base member whereby said lip is free to deflect toward said channel upon compressive engagement of said members without exceeding the elastic limit of the material of said lip so that said incline surface tends to be displaced toward said bearing surfaces whereby said lip formation exerts a constant restoring sealing force between the contiguous flush bearing surfaces of said base member and said second member in the assembled position thereof.

4. The invention as defined in claim 3 wherein the material of said second member is of a hardness less than that of said first member.

5. The invention as defined in claim 3 wherein the complementary surface of said second member is formed to permit the material thereof to flow about the lip formation as said lip formation is flexed upon the assembly of said members to form a mechanical bond and seal therebetween and which seal is positively loaded due to the inherent resiliency of said lip.

6. The invention as defined in claim 3 wherein said bearing surface of said rigid member includes:
   a second channel formed therein,
   said second channel being formed adjacent the other side of said lip formation and having a side wall portion thereof defined by the other side of said lip formation, 7. The invention as defined in claim 3 and including means for retaining the two members in assembly against the urging of said restoring force of said lip formation.

8. A sealing and bonding assembly as defined in claim 3 wherein said base member comprises a headed fastener, and said lip formation being formed on the undersurface of the head of said fastener.

9. The invention as defined in claim 3 wherein said base member comprises an annular sealing washer, and said lip formation being formed on at least one face of said washer.

10. The invention as defined in claim 3 wherein said base member comprises a housing having a wall portion, and said lip formation being shaped of the material of the wall portion of said housing and protruding outward therefrom for effecting an annular fluid pressure seal and mechanical bond between said housing and said second member upon assembly of the two.

11. The invention as defined in claim 3 wherein said lip formation is tapered toward the free end thereof.

12. The invention as defined in claim 3 wherein said second member having an opening therein about which a fluid seal is to be affected, and said lip formation of said base member being adapted to circumscribe said opening.

13. The invention defined in claim 3 wherein said flat bearing surface of said rigid base member comprises the major portion of the surface area of said rigid member and said lip is annularly shaped intermediate the width of said bearing surface.

14. A fastening device comprising:
a rigid base member made of a predetermined hardness, said base member having a substantially planar bearing surface and a circular resilient lip formation integrally formed of said material of said base member,
said lip being connected to said base member so as to have its free end projecting beyond the bearing surface of said rigid member intermediate the width thereof, and said lip being free to flex for resiliently loading said base member in an assembled position thereof,
said free end being defined as a surface inclined relative to the bearing surface,
and a channel formed in said rigid member adjacent said lip whereby a side wall of said channel is defined by a wall portion of said lip, whereby said lip is adapted to the flex toward said channel upon compressive engagement of said base member with a secondary member without exceeding the elastic material of said lip so that said inclined surface has to be displaced toward said bearing surface of said rigid member.

References Cited

UNITED STATES PATENTS

| | | | |
|---|---|---|---|
| 1,679,779 | 8/1928 | Oberhuber | 277—207 |
| 1,816,293 | 7/1931 | Oberhuber | 285—110 |
| 2,210,455 | 8/1940 | Hosking | 151—37 |
| 2,298,552 | 10/1942 | Du Vall | 151—37 |

CARL W. TOMLIN, *Primary Examiner.*

R. S. BRITTS, *Assistant Examiner.*